United States Patent

Wu et al.

[11] Patent Number: 6,156,839
[45] Date of Patent: *Dec. 5, 2000

[54] AQUEOUS DISPERSION OF SMALL PARTICLES OF POLYTETRAFLUOROETHYLENE

[75] Inventors: Huey Shen Wu, Newark; Jack Hegenbarth, Wilmington, both of Del.; Xin Kang Chen; Jian Guo Chen, both of Shanghai, China

[73] Assignee: W. L. Gore & Associates, Inc., Newark, Del.

[*] Notice: This patent is subject to a terminal disclaimer.

[21] Appl. No.: 09/270,377

[22] Filed: Mar. 16, 1999

Related U.S. Application Data

[60] Division of application No. 08/863,771, May 29, 1997, Pat. No. 5,895,799, which is a continuation-in-part of application No. 08/676,100, Jul. 2, 1996, which is a continuation of application No. 08/374,010, Jan. 18, 1995, abandoned.

[51] Int. Cl.[7] ............................... C08L 27/18; C08K 5/02
[52] U.S. Cl. ........................ 524/795; 524/794; 524/805; 526/909
[58] Field of Search .................... 524/795, 794, 524/805; 526/250, 909

[56] References Cited

U.S. PATENT DOCUMENTS

| | | |
|---|---|---|
| 2,559,750 | 7/1951 | Berry . |
| 2,559,752 | 7/1951 | Berry . |
| 2,662,065 | 12/1953 | Berry . |
| 3,721,638 | 3/1973 | Sianesi et al. . |
| 3,941,671 | 3/1976 | Machi et al. ...................... 204/159.22 |
| 4,025,481 | 5/1977 | Tournut et al. ..................... 260/29.6 F |
| 4,384,092 | 5/1983 | Blaise et al. ............................ 526/225 |
| 4,864,006 | 9/1989 | Giannetti et al. ....................... 526/209 |
| 5,399,640 | 3/1995 | Hazlebeck ............................. 526/214 |
| 5,403,900 | 4/1995 | Wu et al. ............................... 526/214 |
| 5,616,648 | 4/1997 | Wu ........................................ 524/805 |

FOREIGN PATENT DOCUMENTS

| | | |
|---|---|---|
| 0 248 446 | 12/1987 | European Pat. Off. . |
| 0 612 770 A1 | 8/1994 | European Pat. Off. . |
| P1 645 356 | 6/1966 | Germany . |
| 4 124 730 | 9/1996 | Germany . |

*Primary Examiner*—Fred Zitomer
*Attorney, Agent, or Firm*—Carol A. Lewis White

[57] ABSTRACT

An aqueous microemulsion polymerization procedure is described in which very small colloidal polymer particles are produced from tetrafluoroethylene monomer. The polymerization procedure involves adding a free-radical initiator to a mixture of a microemulsion of at least one liquid saturated organic compound; and tetrafluoroalkyl ethylene.

22 Claims, No Drawings

AQUEOUS DISPERSION OF SMALL PARTICLES OF POLYTETRAFLUOROETHYLENE

CROSS REFERENCE TO RELATED APPLICATIONS

This application is a divisional of application Ser. No 08/863,771 filed May 9, 1997, now U.S. Pat. No. 5,895,799, which is a continuation-in-part application of U.S. Ser. No. 08/676,100, filed Jul. 2, 1996, which is a continuation of U.S. Ser. No. 08/374,010, filed Jan. 18, 1995 now abandoned.

FIELD OF THE INVENTION

This invention relates to a process for the polymerization of tetrafluoroethylene which produces very small particle sizes.

BACKGROUND OF THE INVENTION

Microemulsions are stable isotropic mixtures of oil, water, and surfactant which form spontaneously upon contact of the ingredients. Other components, such as salt or co-surfactant (such as an alcohol, amine, or other amphiphilic molecule) may also be part of the microemulsion formulation. The oil and water reside in distinct domains separated by an interfacial layer rich in surfactant. Because the domains of oil or water are so small, microemulsions appear visually transparent or translucent. Unlike emulsions, microemulsions are equilibrium phases.

Microemulsions can have several microstructures, depending upon composition and sometimes temperature and pressure. There are three most common structures. One is an oil-in-water microemulsion in which oil is contained inside distinct domains in a continuous water-rich domain. The second is a water-in-oil microemulsion, in which water is contained inside distinct domains (droplets) in a continuous oil-rich domain. The third is a bicontinuous microemulsions in which there are sample-spanning intertwined paths of both oil and water, separated from each other by the surfactant-rich film.

Polymerization of emulsified and microemulsified unsaturated hydrocarbon monomers is known, where high reaction rates, high conversions and high molecular weights can be achieved. A microemulsion can be distinguished from a conventional emulsion by its optical clarity, low viscosity, small domain size, thermodynamic stability, and spontaneous formation. Polymerization of microemulsified monomers has many advantages over traditional emulsion polymerization. Microemulsions are normally transparent to translucent so that they are particularly suitable for photochemical reactions, while emulsions are turbid and opaque. Also, the structural diversity of microemulsions (droplets and bicontinuous) is set by thermodynamics, and rapid polymerization may be able to capture some of the original structure. In addition, microemulsion polymerization enables production of stable, monodisperse microlatexes containing colloidal particles smaller than those produced from classical emulsion polymerization processes. Smaller particle size improves the ability to form coatings without microcracking. The increased surface area improves particle fusion during molding operations.

Emulsion polymerization, as opposed to microemulsion polymerization, of dissolved gaseous tetrafluoroethylene (PTFE) or its copolymers is a known process. Aqueous colloidal dispersions of PTFE or its copolymers can be prepared in a pressure reactor by placing the gaseous monomer, or a mixture of monomers in contact with an aqueous solution containing at least one surfactant which generally is a fluorinated surfactant, possibly a buffer for keeping the medium at a given pH, and an initiator which is capable of forming free radicals at the polymerization temperature. The free radical initiators can be water soluble peroxides, or alkaline or ammonium persulfates. Persulfate can be used alone if the polymerization temperature is above approximately 50° C., or in association with a reducing agent such as ferrous salt, silver nitrate, or sodium bisulfate if the polymerization temperature is approximately between 5 to 55° C., as described in the U.S. Pat. No. 4,384,092.

The gaseous monomer molecules in the foregoing process enter the aqueous liquid and react to form polymer without first forming a distinct liquid phase. Thus the polymer particles are large particles suspended in the aqueous mixture; and the process is not a true liquid-in-liquid emulsion polymerization. The process is sometimes referred to as dispersion polymerization.

Additives have been used in attempts to alter the polymerization processes and products thereof. For example, in U.S. Pat. 3,721,638, a perfluorinated ether ketone is taught as being added to an aqueous phase polymerization system for polymerizing tetrafluoroethylene, but the initial product is in the form of an aqueous gel.

Attempts have been made to prepare tetrafluoroethylene copolymers in aqueous dispersion systems. For example, EP 0612770 teaches the copolymerization of TFE and fluoroalkyl perfluorovinyl ethers in an aqueous system containing methylene chloride to obtain dispersion copolymer particles of an average of less than 50 nm in size.

U.S. Pat. No. 4,864,006 describes the polymerization of TFE and hexafluoropropylene (HFP) to make a copolymer in an aqueous microemulsion containing a perfluoropolyether in which the resulting copolymer particles have a size ranging from 0.041 to 0.070 micrometer.

Microemulsion polymerization operates by a different mechanism than emulsion polymerization. It involves polymerization of liquid monomer rather than gaseous monomers. Because the polymerization involves polymerizates of unusually small cells of liquid monomer, the resulting polymer particles are unusually small. However, polymerization of liquid TFE is not usually practiced, because of the potential hazards of handling liquid TFE.

It is desirable to provide a process for polymerizing TFE to produce homopolymer dispersions in which the particle size of the polymer particles is very small. Microemulsion polymerization systems would be useful in reaching this goal if a means could be found for adapting TFE to polymerization in an aqueous microemulsion system. Such a TFE polymerization system would result in small particles.

SUMMARY OF THE INVENTION

The aqueous microemulsion polymerization procedure of the invention comprises: initiating polymerization by adding a free-radical initiator to an aqueous microemulsion of a liquid perfluorinated saturated aliphatic or aromatic hydrocarbon having up to two oxygen, nitrogen or sulfur atoms and having a molecular weight preferably below 500, which aqueous microemulsion contains tetrafluoroethylene monomer.

The microemulsion is formed by adding the perfluorinated saturated aliphatic or aromatic in liquid form and a fluorinated organic surfactant to water in proportions and at temperatures that result in formation of a microemulsion.

Very small aqueous dispersion polytetrafluoroethylene particles are formed as a result of the polymerization, an average particle size of on the order of 80 nm or less (0.08 micrometer). The average particle size may be less than 60nm or even less than 30 nm.

In one embodiment gaseous TFE is added.

In another embodiment liquid TFE is added.

DETAILED DESCRIPTION OF THE INVENTION

In this invention, an aqueous microemulsion polymerization procedure is described for producing unusually small particles of polytetrafluoroethylene (PTFE), in which the polymerization of TFE is carried out in the presence of microemulsified seed particles or micelles of a liquid perfluorinated hydrocarbon that is a saturated aliphatic or aromatic organic compound having up to 2 oxygen, nitrogen, or sulfur atoms and a molecular weight preferably below 500.

The polymer particles so produced are usually small, being on the order of an average size of 1 to 80 nanometers (0.001 to 0.080 micrometer), preferably 1 to 60 nanometers and most preferably 1 to 30 nanometers. It is believed that such unusually small polymer particles are obtained because polymerization of the gaseous TFE takes place inside the very small micelles of the hydrocarbon organic compound in the microemulsion.

The perfluorinated hydrocarbon is a low molecular weight compound that is liquid at the temperature at which polymerization is carried out. The molecular weight is preferably less than 500. The perfluorinated hydrocarbon preferably has a boiling point less than 230° C. The perfluorinated hydrocarbon can be a perfluorinated saturated aliphatic compound such as a perfluorinated alkane; a perfluorinated aromatic compound such as perfluorinated benzene, or perfluorinated tetradecahydro phenanthene. It can also be a perfluorinated alkyl amine such as a perfluorinated trialkyl amine. It can also be a perfluorinated cyclic aliphatic, such as decalin; and preferably a heterocyclic aliphatic compound containing oxygen or sulfur in the ring, such as perfluoro-2-butyl tetrahydrofuran.

Examples of perfluorinated hydrocarbons include perfluoro-2-butyltetrahydrofuran, perfluorodecalin, perfluoromethyidecalin, perfluorodimethyidecalin, perfluoromethylcyclohexane, perfluoro(1,3-dimethylcyclohexane), perfluorodimethyidecahydronaphthalene, perfluorofluoorene, perfluoro(tetradecahydrophenanthrene), perfluorotetracosane, perfluorokerosenes, octafluoronaphthalene, oligomers of poly (chlorotrifluoroethylene), perfluoro(trialkylamine) such as perfluoro(tripropylamine), perfluoro(tributylamine), or perfluoro(tripentylamine), and octafluorotoluene, hexafluorobenzene, and commercial fluorinated solvents, such as Fluorinert FC-75 produced by 3M. The fluorinated alkanes can be linear or branched, with a carbon atom number between 3 and 20. Oxygen, nitrogen or sulfur atoms can be present in the molecules, but the number of such atoms per molecule should be 2 or less.

The preparation of the microemulsion depends on careful selection of the ingredients. The microemulsion is prepared by mixing water, perfluorinated hydrocarbon, fluorinated surfactant(s), and optionally cosolvents or inorganic salts. The amounts employed are 0.1–40 weight percent, preferably 0.1–20, of the perfluorinated hydrocarbon, 0.1–40 weight percent, preferably 0.1–25, of the surfactant and optionally cosurfactants; with the remainder water. The microemulsified perfluorinated hydrocarbons are believed to serve as microreactors for fluorinated monomers to enter and to be polymerized. The average particle size of the microemulsions can be in the range of 1 to 80 nanometer, preferably 1 to 60, most preferably 1 to 30. The temperature of the microemulsion formation can be between 0 to 150° C., preferably 40 to 100° C.

The fluorinated surfactant has the structure $R_f E X$, where $R_f$ is a fluorinated alkyl group with a carbon number between 4 and 16, E is an alkylene group with a carbon number between 0 and 4, and X is an anionic salt such as COOM, $SO_3M$, $SO_3NR_2$, $SO_4M$, a cationic moiety such as quarternary ammonium salt, or an amphoteric moiety such as aminoxide, or a non-ionic moiety such as $(CH_2CH_2O)n^H$; and M is H, Li, Na, K, or $NH_4$; R is a 1 to 5C alkyl group and n is a cardinal number of 2 to 40.

When tetrafluoroethylene is referred to herein, it is understood the term includes the so-called modified "homopolymer, in which the polymer chain includes very small amounts of units derived from perfluorol(propyl vinyl ether) or hexafluoropropylene.

To initiate polymerization, the temperature of the microemulsion is adjusted to between 0 and 150° C., preferably 40 to 100° C. Initiators for polymerization include free-radical initiators, such as persulfates, azo initiators, peroxides, or photo initiators which can generate free radicals by ultraviolet or gamma rays. Amount of initiators present can range between 0.001 to 5 percent by weight based on the final polymer content. Cosolvents such as an alcohol, amines or other amphiphilic molecules, or salt can be employed if desired to facilitate formation of the microemulsion.

Tetrafluoroethylene is introduced to the reactor from the vapor or liquid phase into the aqueous liquid either before or after formation of the microemulsion. Sufficient mixing between aqueous and the TFE is important to encourage mass transfer. The mechanism of forming the ultra small polymer particles is not fully understood. It is believed that the higher the solubility of the tetrafluoroethylene monomer in the perfluorinated hydrocarbon, the better to achieve the original microemulsion particle size and shape. The time of reaction may be between 1 and 500 minutes.

The resulting polymer particles in the resulting dispersion have an average particle size of between 1 and 80 nanometer, preferably 1 to 60, most preferably 1 to 30, and a polymer average molecular weight of over 100,000, preferably over 1,000,000. The unusually small particle size provides a polymer system with a number of advantages over systems containing larger particles. The system is an aqueous colloidal dispersion, and is clear rather than turbid.

A small amount of units from comonomers may be present in the polymer, provided the amount of comonomer that can be present is not so great as to change the nature of the product that would be obtained if PTFE had been the product. In other words, the copolymer is still not melt processible. The comonomer can be a halogenated (chlorine or fluorine) olefin of 2–18 carbon atoms, for example vinyl chloride, vinylidene chloride, chlorotrifluoroethylene, hexafluoropropylene, perfluoroalkyl vinyl ether, or the like; hydrogenated unsaturated monomers, such as ethylene, propylene, isobutylene, vinyl acetate, acrylates, or the like; crosslinking agents, such as glycidylvinylether, chloroalkyl vinyl ether, allyl-glycidylether, acrylates, methacrylates, or the like.

The resulting ultra fine colloidal particles can be mixed with other chemicals, polymers, pigments, carbons, or metals to form a composite material such as a polymer alloy, a strain resistant, mold release coating on articles, or electronic conductors or shieldings, etc. They can be prepared in the form of organosols to impart ultrafine surface coating on substrates, such as fabrics, metals, ceramics, etc. The ultrafine powder of PTFE can also be used to prepare microporous expanded PTFE articles with ultra small pore size. In addition, the PTFE containing colloidal particles can be used as a white pigment or a modifier which improves flame resistance, non-tackiness, water repellency, soil resistance, corrosion resistance, and weather resistance properties on various substrates, porous or nonporous. The polymers can be also used to form a membrane for filtration, microfiltration or ultrafiltration applications.

TEST PROCEDURES

Particle Size Determination

A COULTER N4MD particle size analyzer was used. The mean diameter is measured using light scattering method-with helium laser at scattering angle of 90 degree. Each aqueous dispersion sample was diluted about 10,000 times with deionized water before measurement.

Melting Temperature

The melting temperature of a polymer was determined by Differential Scan Calorimetric (DSC) analysis at a heating rate of 10° C./minute under nitrogen purge. If it shows a major endotherm at the peak of a certain temperature, it is reported as the melting temperature of the polymer.

Heat of Crystallization

Heat of crystallization of a polymer was also determined by DSC at a heating and cooling rate of 10° C./minute from 200° C. to 400° C. and back to 200° C. under nitrogen purge. Heat of crystallization is recorded during the cooling process.

Decomposition Temperature

Decomposition temperature of a polymer was determined by thermal gravimetric analysis (TGA) on the solid polymer at a heating rate of 20° C./minute in air. It shows a decomposition temperature curve, where the derivative of the curve has a peak at certain temperature. That temperature is reported as the decomposition temperature of the polymer.

EXAMPLE 1

In a 2-liter reactor were added 900 grams of deionized water, 25 grams of Fluorinert FC-75 which is obtained from 3M Corp. and contains at least a major component of perfluoro-(2-butyltetrahydrofuran), 25 grams of ammonium perfluorooctanoate (Fluororad FC-143, 3M). The mixture formed a transparent microemulsion phase at room temperature and was stirred at a speed of about 800 rpm. The reactor was then vacuumed and purged with tetrafluoroethylene gas three times to ensure oxygen content in the mixture to be below 30 ppm. Then the temperature of the mixture was raised and maintained at about 82° C. Then the pressure inside the reactor was raised to about 11 kg/cm$^2$ with a supply of tetrafluoroethylene gas. 1.0 grams of ammonium persulfate in 50 grams of water was pumped into the reactor to start the reaction. The pressure inside the reactor was maintained at 11 kg/cm$^2$ with a constant supply of tetrafluoroethylene. Reaction proceeded for about 60 minutes after ammonium persulfate was charged. Then additional 0.5 gram of ammonium persulfate in 50 gram of water was charged to the reactor. The reaction continued to proceed for another 70 minutes and was stopped.

The dispersion produced from the above reaction was clear and transparent. The solid polymer content was about 12% by weight. The average polymer particle size was determined to be about 25 nanometer. Differential Scan Calorimetric (DSC) analysis of the polymer showed a melting temperature peak of 327° C. and heat of crystallization of 16.31 cal/gram. Thermal decomposition temperature of the polymer was determined to be 531° C. These are typical characteristics of polytetrafluoroethylene.

EXAMPLE 2

In a 2-liter reactor were added 900 grams of deionized water, 25 grams of perfluorinated decalin (supplied from PCR), and 25 grams of ammonium perfluorooctanoate (Fluororad FC-143, 3M). The mixture formed a transparent microemulsion phase at room temperature and was stirred at a speed of about 800 rpm. The reactor was then vacuumed and purged with tetrafluoroethylene gas three times to ensure oxygen content in the mixture to be below 30 ppm. Then the temperature of the mixture was raised and maintained at about 82° C. Then the pressure inside the reactor was raised to about 11 kg/cm$^2$ with a constant supply of tetrafluoroethylene. Reaction proceeded for about 60 minutes after ammonium persulfate was charged. Then additional 1.0 grams of ammonium persulfate in 50 grams of water was charged to the reactor. The reaction continued to proceed for another 100 minutes and was stopped.

The dispersion produced from the above reaction was clear and transparent. The solid polymer content was about 14% by weight. The average polymer particle size was determined to be about 20 nanometer. Differential Scan Calorimeteric (DSC) analysis of the polymer showed a melting temperature peak of 325° C. and heat of crystallization of 16.35 cal/gram. Thermal decomposition temperature of the polymer was determined to be 531° C. These are typical characteristics of polytetrafluoroethylene.

EXAMPLE 3

In a 2-liter reactor were added 900 grams of deionized water, 50 grams of Fluorinert FC-75 (3M), and 50 grams of ammonium perfluorooctanoate (Fluororad FC-143, 3M). The mixture formed a transparent microemulsion phase at room temperature and was stirred at a speed of about 800 rpm. The reactor was then vacuumed and purged with tetrafluoroethylene gas three times to ensure oxygen content in the mixture to be below 30 ppm. Then the temperature of the mixture was raised and maintained to be about 82° C. Then the pressure inside the reactor was raised to about 11 kg/cm$^2$ with a supply of tetrafluoroethylene gas. 1.0 grams of ammonium persulfate in 100 grams of water was pumped into the reactor to start the reaction. The pressure inside the reactor was maintained at 11 kg/cm$^2$ with a constant supply of tetrafluoroethylene. Reaction proceeded for about 160 minutes after ammonium persulfate was charged. Then the reaction was stopped.

The dispersion produced from the above reaction was clear and transparent. The solid polymer content was about 16% by weight. The average polymer particle size was determined to be about 32 nanometer. Differential Scan Calorimetric (DSC) analysis of the polymer shows the melting temperature peak of 329° C. and heat of crystallization of 16.71 cal/gram. Thermal decomposition temperature of the polymer was determined to be 543° C. These are typical characteristics of polytetrafluoroethylene.

EXAMPLE 4

In a 2-liter reactor were added 900 grams of deionized water, 25 grams of perfluorinated tetradecahydrophenanthrene (supplied from PCR), and 25 grams of ammonium perfluorooctanoate (Fluorad FC-143, 3M). The mixture formed a transparent microemulsion phase at room temperature and was stirred at a speed of about 800 rpm. The reactor was then vacuumed and purged with tetrafluoroethylene gas three times to ensure oxygen content in the mixture to be below 30 ppm. Then the temperature of the mixture was raised and maintained at about 82° C. Then the pressure inside the reactor was raised to about 11 kg/cm$^2$ with a supply of tetrafluoroethylene gas. 1.0 grams of ammonium persulfate in 100 grams of water was pumped into the reactor to start the reaction. The pressure inside the reactor was maintained at 11 kg/cm$^2$ with a constant supply of tetrafluoroethylene. Reaction proceeded for about 176 minutes after ammonium persulfate was charged. Then the reaction was stopped.

The dispersion produced from the above reaction was clear and transparent. The solid polymer content was about 23% by weight the average polymer particle size was determined to be about 41 nanometer. Differential Scan Calorimetric (DSC) analysis of the polymer showed a melting temperature peak of 328° C. and heat of crystallization of 15.78 cal/gram. Thermal decomposition temperature of the polymer was determined to be 554° C. These are typical characteristics of polytetrafluoroethylene.

EXAMPLE 5

In a 2-liter reactor were added 900 grams of deionized water, 50 grams of Fluorinert FC-75 (3M), and 100 grams of ammonium perfluorooctanoate (Fluorad FC-143, 3M). The mixture formed a transparent microemulsion phase at room temperature and was stirred at a speed of about 800 rpm. The reactor was then vacuumed and purged with tetrafluoroethylene gas three times to ensure oxygen content in the mixture to be below 30 ppm. Then the temperature of the mixture was raised and maintained at about 82° C. Then the pressure inside the reactor was raised to about 11 kg/cm2 with a supply of tetrafluoroethylene gas. 1.0 grams of ammonium persulfate in 100 grams of water was pumped into the reactor to start the reaction. The pressure inside the rector was maintained at 11 kg/cm$^2$ with a constant supply of tetrafluoroethylene. Reaction proceeded for about 172 minutes after ammonium persulfate was charged. Then the reaction was stopped.

The dispersion produced from the above reaction was clear and transparent. The solid polymer content was about 18% by weight. Differential Scan Calorimeteric (DSC) analysis of the polymer showed a melting temperature peak of 327° C. and heat of crystallization of 15.43 cal/gram. Thermal decomposition temperature of the polymer was determined to be 527° C. These are typical characteristics of polytetrafluoroethylene.

EXAMPLE 6

Example 5 was repeated except that 50 grams of perfluorinated decalin (supplied by PCR) was used instead of 50 grams of Fluorinert FC-75, and the total reaction time after the initiator was added was about 160 minutes.

The dispersion produced from the above reaction was clear and transparent. The solid polymer content was about 20% by weight. Differential Scan Calorimetric (DSC) analysis of the polymer showed a melting temperature peak of 328° C. and heat of crystallization of 15.60 cal/gram. Thermal decomposition temperature of the polymer was determined to be 535° C. These are typical characteristics of polytetrafluoroethylene.

EXAMPLE 7

Example 5 was repeated except that 50 grams of perfluorinated heptane (supplied by PCR) was used instead of 50 grams of Fluorinert FC-75, and the total reaction time after the initiator was added was about 145 minutes.

The dispersion produced from the above reaction was clear and transparent. The solid polymer content was about 16% by weight. Differential Scan Calorimetric (DSC) analysis of the polymer showed a melting temperature peak of 326° C. and heat of crystallization of 16.03 cal/gram. Thermal decomposition temperature of the polymer was determined to be 542° C. These are typical characteristics of polytetrafluoroethylene.

EXAMPLE 8

Example 5 was repeated except that 50 grams of perfluorinated octane (supplied by PCR) was used instead of 50 grams of Fluorinert FC-75, and the total reaction time after the initiator was added was about 160 minutes.

The dispersion produced from the above reaction was clear and transparent. The solid polymer content was about 18% by weight. Differential Scan Calorimetric (DSC) analysis of the polymer showed a melting temperature peak of 328° C. and heat of crystallization of 16.33 cal/gram. Thermal decomposition temperature of the polymer was determined to be a peak at 529° C. These are typical characters of polytetrafluoroethylene.

EXAMPLE 9

Example 5 was repeated except that 50 grams of hexafluorobenzene (supplied by PCR) was used instead of 50 grams of Fluorinert FC-75, and the total reaction time after the initiator was added was about 178 minutes.

The dispersion produced from the above reaction was clear and transparent. The solid polymer content was about 20% by weight. Differential Scan Calorimetric (DSC) analysis of the polymer showed a melting temperature peak of 327° C. and heat of crystallization of 12.66 cal/gram. Thermal decomposition temperature of the polymer was determined to be 539° C. These are typical characteristics of polytetrafluoroethylene.

EXAMPLE 10

Example 5 was repeated except that 50 grams of perfluorinated tripentylamine (supplied by PCR) was used instead of 50 grams of Fluorinert FC-75, and the total reaction time after the initiator was added was about 180 minutes.

The dispersion produced from the above reaction was clear and transparent. The solid polymer content was about 21% by weight. Differential Scan Calorimetric (DSC) analysis of the polymer showed a melting temperature peak of 327° C. and heat of crystallization of 14.26 cal/gram. Thermal decomposition temperature of the polymer was determined to be 539° C. These are typical characteristics of polytetrafluoroethylene.

EXAMPLE 11

Example 5 was repeated except that 50 grams of perfluorinated 1,3-dimethyl cyclohexane (supplied by PCR) was used instead of 50 grams of Fluorinert FC-75, and the total reaction time after the initiator was added was about 207 minutes.

The dispersion produced from the above reaction was clear and transparent. The solid polymer content was about 21 % by weight. Differential Scan Calorimetric (DSC) analysis of the polymer showed a melting temperature peak of 328° C. and heat of crystallization of 15.28 cal/gram.

Thermal decomposition temperature of the polymer was determined to be 531° C. these are typical characteristics of polytetrafluoroethylene.

The clarity and transparency of the dispersions produced in the Examples is indicative of the smallness, on the order of less than 0.06 micrometer, of the colloidal particles in the dispersion.

We claim:

1. An aqueous dispersion containing particles of polytetrafluoroethylene wherein
    a) The particles have an average size between 1 and 60 nanometers,
    b) More than 78% of the particles have an aspect ratio less than 3:1,
    c) The polytetrafluoroethylene solids content in the dispersion is greater than 12% by weight.

2. The aqueous dispersion of claim 1 wherein more than 86% of the particles have an aspect ratio less than 3:1.

3. The aqueous dispersion of claim 1 wherein the particles have an average size between 1 and 30 nanometers.

4. The aqueous dispersion of claim 1 wherein more than 86% of the particles have an aspect ratio less than 3:1; and wherein the particles have an average size between 1 and 30 nanometers.

5. An as polymerized aqueous dispersion of polymerized polytetrafluoroethylene particles wherein
    a) The particles have an average size between 1 and 60 nanometers,
    b) More than 78% of the particles have an aspect ratio less than 3:1,
    c) The polytetrafluoroethylene solids content in the dispersion is greater than 12% by weight.

6. The as polymerized aqueous dispersion of claim 5 wherein more than 86% of the particles have an aspect ratio less than 3:1.

7. The as polymerized aqueous dispersion of claim 5 wherein the particles have an average size between 1 and 60 nanometers.

8. The as polymerized aqueous dispersion of claim 5 wherein the particles have an average size between 1 and 30 nanometers.

9. The as polymerized aqueous dispersion of claim 8, wherein more than 86% of the particles have an aspect ratio less than 3:1.

10. The as polymerized aqueous dispersion of claim 5, wherein the solids content in the dispersions is equal to or greater than 20 percent by weight.

11. The as polymerized aqueous dispersion of claim 5, wherein the average size is between 1 and 30 nm: more than 86% of the particles have an aspect ratio less than 3:1; and the polytetrafluoroethylene solids content in the dispersion is greater than 20% by weight.

12. An article having a coating on a substrate, wherein the coating is formed from the dispersion according to claim 5.

13. An article according to claim 12, wherein the substrate is a fabric.

14. The as polymerized aqueous dispersion of claim 5, wherein the dispersion includes a perfluorinated saturated aliphatic or aromatic hydrocarbon having up to two oxygen, nitrogen, or sulfur atoms and having a molecular weight below 500.

15. The as polymerized aqueous dispersion of claim 6, wherein the perfluorinated saturated aliphatic or aromatic hydrocarbon has a boiling point below 230° C.

16. The as polymerized aqueous dispersion of claim 5, wherein the dispersion includes a fluorinated organic surfactant.

17. The as polymerized aqueous dispersion of claim 5, wherein the molecular weight of the polytetrafluoroethylene is greater than 1,000,000.

18. The as polymerized aqueous dispersion of claim 5, wherein the dispersion is a microemulsion.

19. The as polymerized aqueous dispersion of claim 5, wherein the dispersion is prepared by a process comprising:
    initiating polymerization by adding a free-radical initiator to an aqueous microemulsion of a liquid perfluorinated saturated aliphatic or aromatic hydrocarbon having up to two oxygen, nitrogen or sulfur atoms, which aqueous microemulsion contains tetrafluoroethylene monomer and at least one fluorinated surfactant.

20. The as polymerized aqueous dispersion of claim 19, wherein the tetrafluoroethylene is in gaseous form.

21. The as polymerized aqueous dispersion of claim 19, wherein the tetrafluoroethylene is in liquid form.

22. The as polymerized aqueous dispersion of claim 19, wherein an aqueous microemulsion of at least one liquid perfluorinated saturated aliphatic or aromatic hydrocarbon that can contain up to two oxygen, sulfur, or nitrogen atoms is formed first and then gaseous tetrafluoroethylene is fed to the microemulsion.

* * * * *